March 18, 1930. W. H. ALLEN 1,750,617
CHEMICAL APPARATUS
Filed March 14, 1927
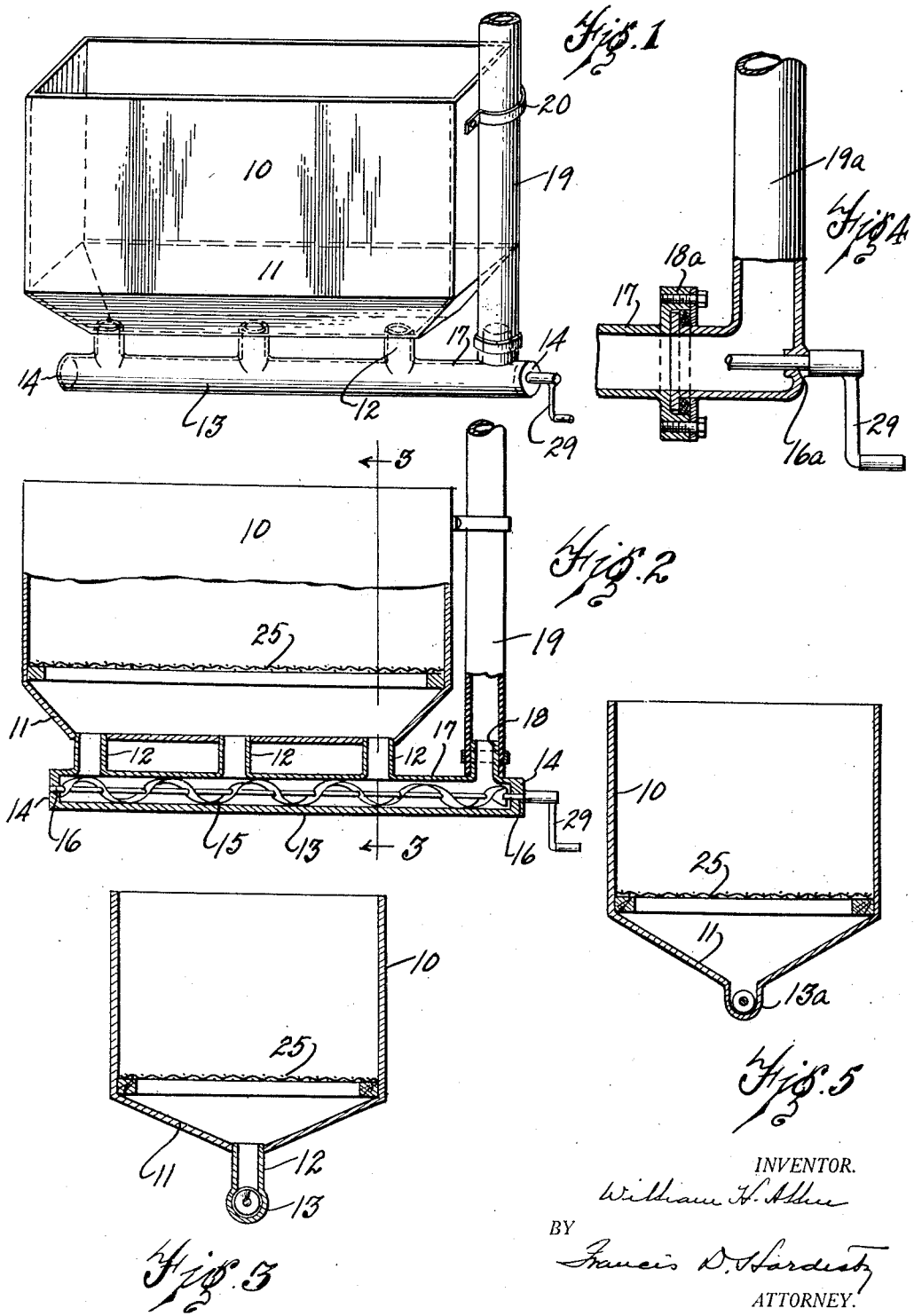
INVENTOR.
William H. Allen
BY
Francis D. Hardesty
ATTORNEY.

Patented Mar. 18, 1930

1,750,617

UNITED STATES PATENT OFFICE

WILLIAM H. ALLEN, OF DETROIT, MICHIGAN, ASSIGNOR, BY MESNE ASSIGNMENTS, TO PARKER RUST PROOF COMPANY, OF DETROIT, MICHIGAN, A CORPORATION OF MICHIGAN

CHEMICAL APPARATUS

Application filed March 14, 1927. Serial No. 175,164.

The present invention relates to chemical apparatus and more especially to tanks for carrying out chemical operations.

In many operations involving chemical treatment of materials of one kind or another in tanks the treatment results in the formation of considerable sediment due to precipitation or to settling out of particles of matter inert in the treatment. Such a collection of sediment requires the more or less frequent shut down of the process in order to clean out the tank.

Among the objects of the present invention, therefore, is a tank capable of overcoming this objection and one that is simple to produce and operate and correspondingly inexpensive.

Other objects will readily appear to those skilled in the art upon reference to the following description and accompanying drawings in which:—

Fig. 1 is a perspective view of a tank embodying the present invention;

Fig. 2 is a partial longitudinal vertical section therethrough;

Fig. 3 is a section on line 3—3 of Fig. 2;

Fig. 4 is a partial longitudinal section showing a modification;

Fig. 5 is a section similar to Fig. 3 showing another modification.

As indicated in the drawings, the invention comprises a tank 10 preferably having its bottom 11 sloping toward the central portion. Beneath this central portion and open to the tank through pipes 12 is a sediment chamber 13. Sediment chamber 13 may be closed at both ends 14 and a screw or other conveyor 15 mounted therein, with bearings 16 in the ends and operable by means of a crank 29 or other suitable means. At one end of the tank, the sediment chamber 13 will be extended in the form of a pipe 17 and be provided with a flanged opening 18 about the flange of which will be secured a length of hose 19 or other suitable flexible conduit.

Conduit 19 will be of sufficient length to extend in upright position to about the top of tank 10.

Instead of the form of sediment chamber shown in Figs. 1 to 3, the chamber may be an open trough as indicated at 13ª in Fig. 5. And instead of the flanged opening 18 as in Figs. 1 and 2, the extension 17 may be provided with a swivel joint 18ª and connected thereby to an L-shaped pipe 19ª in the wall of which may be a bearing 16ª for the conveyor. In either form a strap 20 may be used to hold the conduit upright when not discharging. It is preferred to provide tank 10 with a screen false bottom 25 located a short distance from the true bottom to permit sediment to pass readily to the sloping bottom and then to chamber 13 or 13ª.

In the above described construction sediment may readily be removed from time to time from the tank as required, without the necessity of discontinuing the process.

Having now described the invention and the preferred forms of embodiment thereof it is to be understood that the said invention is to be limited not to the specific details herein set forth and illustrated but only by the scope of the claims which follow.

I claim:—

1. Apparatus for chemical treatment of articles comprising a tank adapted to contain liquid having a sediment chamber open thereto, a conveyor in said chamber and an outlet conduit leading from said chamber and extending to near the top of the tank when not discharging and means permitting lowering of said conduit to permit discharge.

2. Apparatus for chemical treatment of articles comprising a tank adapted to contain liquid having a sediment chamber open thereto, a conveyor in said chamber and a flexible outlet conduit leading from said chamber and extending to near the top of the tank.

3. Apparatus for chemical treatment of articles comprising a tank adapted to contain liquid having a perforate false bottom therein and a sediment chamber open thereto, a conveyor in said chamber and an outlet conduit leading from said chamber and extending to near the top of the tank when not discharging and means permitting lowering of said conduit to permit discharge.

4. Apparatus for chemical treatment of articles comprising a tank adapted to contain liquid having a perforate false bottom therein and a sediment chamber open thereto, a conveyor in said chamber and a flexible outlet conduit leading from said chamber and extending to near the top of the tank.

WILLIAM H. ALLEN.